Sept. 16, 1930. O. SCHAERER 1,775,737
SCREW CUTTING LATHE AND LIKE TURNING ENGINE
Filed June 18, 1929

INVENTOR:
Otto Schaerer
BY: Rugg, Boyes & Bakelar
ATTORNEYS.

Patented Sept. 16, 1930

1,775,737

UNITED STATES PATENT OFFICE

OTTO SCHAERER, OF COLOGNE-ON-THE-RHINE, GERMANY, ASSIGNOR TO THE FIRM ALFRED H. SCHÜTTE, OF COLOGNE-DEUTZ, GERMANY

SCREW-CUTTING LATHE AND LIKE TURNING ENGINE

Application filed June 18, 1929, Serial No. 371,748, and in Germany March 10, 1928.

The present invention especially relates to leading screw turning machines, automatic screw-cutting lathes or the like, in which the blank on which the thread is cut constantly rotates in the same direction, while the leading-screw and at the same time the tool slide is temporarily reversed, i. e., moved backwards, when a new cut is to be made. The advantage of this kind of turning machine over the type in which, in order to start a new cut, both the blank and the leading-screw move backwards together with the slide, lies in the fact that in each reversal the masses to be accelerated and retarded are less and always remain constant. On the other hand, machines of the former kind possess the following drawbacks as compared with the latter. With the latter machines, in which at each reversal the blank and the tool move backwards simultaneously, the tool assumes the right position with respect to the blank at any moment, so that at the beginning of the new cut the correct engagement in the thread to be cut is immediately present. This however does not directly apply to the first mentioned type of machine in which only the leading screw together with the tool is reversed.

The object of the present invention is to provide an automatic screw cutting and thread catching device for any turning machine the blank-carrying spindle of which is always rotated in the same direction. The invention resides in that, at the end of the desired quick backward motion of the tool-slide, the tool is automatically thrown into the correct position to engage in the cut thread by effecting the automatic or non-automatic intercalation of a mono-tooth coupling with the toothed wheel, mounted on the change wheel axle and driven by the spindle in any desired ratio, always at the correct moment and by means of a stop gearing, this stop gearing being engaged by the blank carrying spindle at one angular position of the spindle only. The new device possesses the advantage that the thread to be cut and the leading screw thread need not be the same so that the former, for instance, may be a steep thread and the leading screw need not continuously have the same rotation, so that the retrograde motion of the tool slide can take place without opening the leading screw nut i. e., also automatically. Moreover by the possibility of combining any small feed of the work with any desired quick backward motion an important saving of time is attained.

In the drawing accompanying this specification,

Figure 1:
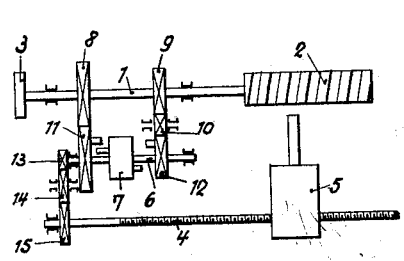
Fig. 1 is a diagrammatic plan view illustrating a work-carrying spindle and a tool spindle having gearing for imparting rotation to the tool spindle in both directions at the same speed as the work spindle.

Referring to the drawing, 1 designates a spindle carrying a blank 2 on which a thread is to be cut, said spindle being adapted to be rotated constantly and in the same direction by means of a pulley 3 or similar driving device. For permitting the reversal of the motion of the leading screw 4 on which is threaded a tool slide 5, a sleeve 7 of a mono-tooth coupling is adjustably mounted on a so-called "change-speed" shaft 6 disposed between the work spindle and the leading screw, said coupling being mounted for rotation with but slidable on said shaft. Mounted for free rotation on the change-speed shaft 6 near its opposite ends are a pair of gears 11 and 12, which are driven from the spindle 1 in opposite directions by means of a gear 8 in mesh with gear 11, and a gear 9 in mesh with an idler pinion 10, which in turn meshes with gear 12.

According to whether the coupling sleeve 7 is thrown into engagement with one or the other gear 11 or 12, the change-speed shaft 6 will rotate in one direction or the other and in consequence the reversal of the leading screw, driven by means of the gearing 13, 14, 15, is effected. If the two gears 8 and 11 for the forward drive have an equal number of teeth, that is, if their transmission ratio is 1:1, as indicated in Fig. 1, then the spindles 1 and 6 will rotate at the same speed and the coupling sleeve 7, having one tooth only, may be thrown into engagement with one or the other gear in any angular position of the spindle 1, with certainty that the tool will always start the cutting action at the same point of the blank.

Figure 2:
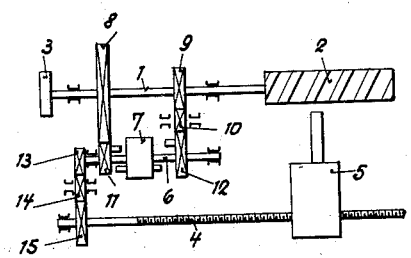
Fig. 2 is a view similar to Fig. 1 but showing gearing for imparting to the tool spindle rotation at greater speed in one direction than that of the work spindle.

However, if, as indicated in Fig. 2, the ratio of the gears 8 and 11 is not 1:1, but some other ratio, for instance 8:1, that is, if a so-called "steep" screw cutting device is employed in which the shaft of the change-speed is driven by the so-called "connecting gearing" 8 and 11 certain difficulties will arise, as in this case the change-speed shaft 6 rotates eight times while the spindle 1 rotates once, and therefore it would be possible to engage the coupling sleeve 7 with the gear wheel 11 at eight different angular positions of the spindle 1. Of these positions, however, only one, namely that at which the initial cutting of the thread was begun, can be used. Consequently it was hitherto possible only in hand controlled machines to make use of steep thread-cutting devices in connection with machines in which the change-wheel axles 6 are reversed without a simultaneous reversal of the blank 2. Such use however, was not possible in automatic machines such as screw cutting machines.

With machines controlled by hand the correct starting position of the tool is found by making use of two marks, one of which indicates the starting position of the tool slide while the other marks the corresponding position of the spindle. This action is understood in the art by the term "catching the thread". The operator must set the two marks to correspond very carefully and subsequently intercalate the coupling sleeve 7 in the gear 11. It has therefore been attempted to obtain the intercalation of the slide-drive at the correct moment by means of a stop or ratchet gearing controlled by the blank-carrying spindle. Hitherto such devices were known only in connection with turning machines in which the leading screw rotates constantly and in the same direction, so that in consequence the tool-slide can be moved backwards only by hand after opening the leading screw nut, and moreover the thread to be cut on the blank must be equal to that on the leading screw. Such devices cannot however be used on other turning machines.

Figure 3:
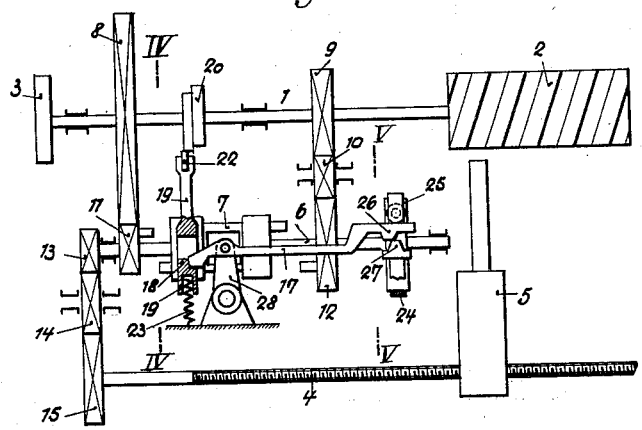
Fig. 3 is a plan view of a complete head stock of a leading screw turning machine illustrating one embodiment of the invention.

As shown in Fig. 3, toothed wheels 11 and 12, which are loosely revolving on the change speed shaft 6, are driven in opposite directions in the same way as with the turning machine according to Fig. 2, from the spindle 1 continuously rotating in the same direction by means of gear wheels 8 and 9. Further gear wheels may, if desired, be intercalated between the toothed wheels 8 and 11 so as to obtain any required ratio greater than, smaller than or equal to 1:1. According to the arrangement shown in Fig. 3 after the sleeve 7 has been thrown into engagement with the gear wheel 11 the change-speed shaft 6 has a greater speed of rotation than blank-carrying spindle 1.

Figure 4:
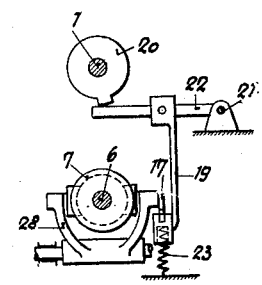
Fig. 4 is a transverse sectional view taken on the line IV—IV of Fig. 3.

In order to ensure that the automatic or non-automatic intercalation of the sleeve 7 in the gear wheel 11 is possible only at the correct angular position of the blank-carrying spindle 1 and consequently that the tool, mounted on slide 5, when starting a new cut is always positioned exactly to correspond with the thread to be cut in the blank 2, the following device is used:

A rod 17 is pivoted on a forked-lever 28 adapted to displace the sleeve 7, this forked lever being rocked in non-automatic machines by means of any rod, not shown in the drawings, and in automatic machines by the action of a spring or weight or in any other mechanical way. The rod 17 co-operates with projection 18 provided on a vertical stop-rod 19. As long as this projection lies in the path of the rod 17 the latter, together with the sleeve 7, cannot be moved to the left to its final position. Consequently an engagement of the sleeve 7 with the toothed wheel 11 is not permitted even if this were possible in view of the corresponding positions of the teeth of the mono-tooth coupling. Not until the projection 18 no longer obstructs the rod 17 is an inter-engagement possible. This, however, takes place only at a very definite angular position of the spindle 1, namely when a cam disc 20 mounted on the spindle 1 depresses a lever 22 which is pivoted at a point 21 (Fig. 4); when this occurs the stop rod 19 mounted on the lever 22 is also depressed against the action of a spring 23.

The path to the left for the rod 17 is then unobstructed, so that the sleeve 7 may automatically or non-automatically be engaged with the toothed wheel 11 in the manner set forth above.

If subsequently the sleeve 7 is disengaged and is engaged with the toothed wheel 12 for the retrograde motion the spring 23 presses stop-rod 19 upwardly again. By this the intercalation of sleeve 7 in toothed wheel 11 is again stopped by means of the projection 18 until in the way described and in a definite angular position of the blank-carrying spindle, the re-engagement of the sleeve 7 is made possible by the release of stop gearing 17, 19, 22 effected by the spindle 1. The cam disc 20 may also be mounted on any other axle, the speed of rotation of which must however be dependent on that of the spindle 1. The number of projections mounted on the cam 20 must then be chosen in accordance with the speed transmitted to the axle carrying the cam.

Figure 5:
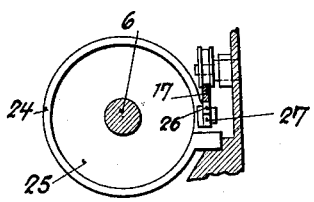
Fig. 5 is a sectional view taken on the line V—V of Fig. 3.

Depending upon the choice of the driving wheels 8, 11 and 9, 10, 12 it is possible that a very high rate of revolution is imparted to the change speed shaft 6, so that in reversing from the progressive motion into the retrograde one and vice versa the rotating masses must suddenly and rapidly be accelerated from one direction into the opposite one. This involves jars and shocks to the mono-tooth coupling used, so that both the coupling and the parts of the gearing employed may be damaged. In order to avoid these drawbacks a brake 24, 25 (Figs. 3 and 5) acting on the change speed shaft 6 is operated during the displacement of the sleeve 7 for the change from the forward to the retrograde motion and vice versa by means of a gear connected to the sleeve 7; this brake operating gear will now be described. A projection 26 is provided on the right hand free end of the rod 17 which is connected to the forked lever 28. When the sleeve 7 is displaced from the right to the left, or vice versa, this projection 26 temporarily depresses projection 27 mounted on a brake band 24. Consequently the brake band contacts for a short period of time with the brake drum 25 keyed on change speed shaft 6, causing braking of the rotating elements. If now the motion of the rod 17 is continued until the sleeve 7 firmly engages with the toothed wheel 12 or with the toothed wheel 11 as the case may be, the projection 27 is released so that the stopped parts may again be put in rotation in any direction without involving any prejudicial shocks or the like. The brake-system above described may be mounted on any machine in which it is desired to avoid prejudicial shocks and the like due to changing the direction of rotation of parts of the gearing.

I claim:—

1. A turning machine, comprising a blank carrying spindle having unidirectional rotation, a reversible leading screw, a tool-carrying slide in threaded engagement with said screw, intermediate change-speed gearing driven from the blank carrying spindle, a mono-tooth coupling governing the drive of said gearing, machine for controlling the operation of said coupling, and a cam rotatable with said blank-carrying spindle and adapted to actuate said control mechanism.

2. A turning machine, comprising a blank carrying spindle having unidirectional rotation, a reversible leading screw, a tool-carrying slide in threaded engagement with said screw, intermediate change speed gearing driven from the blank-carrying spindle, a mono-tooth coupling governing the drive of said gear, mechanism for controlling the operation of said coupling, a cam mounted on said blank-carrying spindle and adapted to actuate said control mechanism thereby to determine the instant of intercalation of said mono-tooth coupling.

3. A turning machine, comprising a blank-carrying spindle having unidirectional rotation, a reversible leading screw, a tool-carrying slide in threaded engagement with said screw, means for reversing the direction of rotation of said leading screw and including intermediate gearing, and an automatically operated brake device acting on said intermediate gearing.

4. A turning machine, comprising a blank-carrying spindle having unidirectional rotation, a reversible leading screw, a tool-carrying slide in threaded engagement with said screw, means for reversing the direction of rotation of said leading screw, means for controlling the actuation of said reversing means, and a brake device for influencing the drive of said leading screw and automatically operated simultaneously with the actuation of said controlling means.

5. A turning machine, comprising a continually rotating blank-carrying spindle, a reversible leading screw, a cam disc on said blank-carrying spindle, stop mechanism actuated by said cam disc and comprising a pivoted lever carrying a spring opposed dependent member, and reversing mechanism controlled by said stop mechanism.

In testimony whereof I have signed my name to this specification.

OTTO SCHAERER.